UNITED STATES PATENT OFFICE.

JASPER H. SINGER, OF NEW YORK, N. Y.

IMPROVEMENT IN BIRD-CAGE MATS.

Specification forming part of Letters Patent No. 111,579, dated February 7, 1871; reissue No. 6,122, dated November 3, 1874; application filed October 14, 1874.

*To all whom it may concern:*

Be it known that I, JASPER H. SINGER, of New York city, in the county and State of New York, have invented an Improvement in Bird-Cage Mats; and I do hereby declare that the following is a full and exact description thereof.

Previous to my invention it has been customary in the keeping of birds in cages to use coarse sand or fine gravel, placed either upon the floor or bottom of the cage, or upon a piece of paper laid thereon, mainly for the purposes of affording to the bird those conditions of nature which are conducive to its wholesome digestion and the health of its feet; and, secondarily, to facilitate the complete removal from the cage of the excrementitious deposits, and induce to greater cleanliness therein, and greater convenience to the person taking care of the bird.

In either of the usually-employed modes of affording to the bird the necessary sand or gravel floor to walk and scratch on and peck at, not only is the great inconvenience in the handling of the materials, and trouble in its placement in and removal from the cage, which must occur very frequently, but the loose stuff is often scattered and thrown from the cage by the bird, and dirties the room in which the cage may be kept.

My invention has for its object to provide a means by which, while the bird may be supplied with the necessary sand or gravel, all the objections mentioned may be avoided; and to these ends my invention consists in a cage-mat adapted to be placed on the floor or bottom of the cage, and made with a sand or gravel surface, as will be hereinafter more fully explained.

In carrying out my invention I have found it to work successfully when practiced in the following manner, viz: Sheets of fibrous material—by preference, heavy Manila paper—are cut to the proper size and shape to fit over or cover the cage-bottom. One side of such paper covering or carpet is covered with a well-made, but not too thick, paste, and while the paste is yet moist a sufficient quantity of coarse sand or fine gravel is sifted or sprinkled on and incorporated into the pasty surface. When the paste shall have thoroughly dried or solidified, any superfluous sand or gravel which may not have adhered is shaken off. The mat thus formed of the fibrous foundation and granular surface united by the paste may then be pressed flat, when it will be ready for transportation (in packages) and use.

I have found a paste or cementing compound composed of some farinaceous material to answer admirably as the means of uniting the sand or gravel with the base or foundation of the cage-mat, and have given such farinaceous paste the preference over other cementing compounds, such as glue, &c., because it will not retain the particles of sand or gravel so tenaciously as to prevent the bird from scratching and pecking off the granular material for its own use and benefit, and, if wetted by the water frequently spilled in the cage, or dashed out of the tub by the bird in bathing, it will not stick to the bird's feet and incommode or injure it, as glue or other sticking compounds are liable to do, and, besides, it is perfectly harmless to the bird if eaten by it.

It will be seen that by my invention a new and most useful article is afforded, viz., a gravel-paper bird-cage mat embodying in itself, complete, a false bottom for the cage readily applied to and removed therefrom, and also the natural conditions or ingredients necessary to the bird's health and comfort. All dirt and inconvenience is obviated, while at the same time the bird gains all the necessary requirement of a sand or gravel floor to walk and scratch on, and from which to gather as much of the granular material as it may need.

It will be observed and understood that the ordinary sand-paper and other analogous materials or articles known to commerce and the arts are not adapted to the purposes to which my invention is adapted and has been most successfully applied, and my bird-cage mat should not be confounded with any such previously-known articles.

Ordinary sand-paper is not useful for the purposes of a bird-cage mat, nor can it be employed for any such purpose, because its roughened surface, being composed of crushed glass, presents cutting-edges, which would injure the bird's feet; and in all previously-known materials composed of a foundation material having its surface roughened by the cementation thereto of fine particles of hard mineral substance, the particles have been purposely so tenaciously attached to the foundation as to render their removal for use by the bird impossible.

Having so fully explained my invention that any skilled person can make and use it, what I claim as new, and desire to secure by Letters Patent, is—

A bird-cage mat composed of sand or gravel attached to a suitable base by an easily-yielding paste, substantially as described, whereby the sand or gravel will be held without displacement during transportation or handling, but may be readily removed by the bird, as set forth.

In testimony whereof I have hereunto set my hand and seal this 9th day of October, 1874.

JASPER H. SINGER. [L. S.]

In presence of—
J. N. McINTIRE,
JACOB FELBEL.